United States Patent [19]

Kimber et al.

[11] 4,388,742
[45] Jun. 21, 1983

[54] RETAINER CLIP AND RETAINER CLIP BACKING MEMBER COMBINATION FOR WINDSHIELD WIPER BLADE ASSEMBLIES

[75] Inventors: Edward G. Kimber, Carlisle; Peter C. Norris, Oakville, both of Canada

[73] Assignee: Tridon Limited, Hamilton, Canada

[21] Appl. No.: 299,266

[22] Filed: Sep. 3, 1981

[51] Int. Cl.³ ............................................. B60S 1/02
[52] U.S. Cl. ................................................. 15/250.42
[58] Field of Search ......................... 15/250.36–250.42

[56] References Cited
U.S. PATENT DOCUMENTS 3,866,261 2/1975 Stratton ............................ 15/250.42
3,919,736 11/1975 Bourassa et al. ................. 15/250.42

Primary Examiner—Peter Feldman
Attorney, Agent, or Firm—Hirons, Rogers & Scott

[57] ABSTRACT

The invention provides a retainer clip for holding the backing member of a windshield wiper assembly against longitudinal movement in the claws of a superstructure in which it is mounted. In a first embodiment a claw-like body has a resilient tongue formed on its upper wall by two parallel slots, the tongue having on its underface a projection that cooperates with a recess in the backing member to retain them against relative movement. A longitudinally-extending transverse flexible integral arm has a hook portion at its end that can embrace a superstructure mounting claw, so that the claw is trapped between the clip body and the hook portion against longitudinal movement, and the backing member is thereby retained in the superstructure. A preferred backing member is provided with a number of the above-mentioned cooperating recesses spaced longitudinally from one another, each of which is designated to make the combination suitable for a replacement wiper blade assembly of a different size and/or a different manufacturer. In an alternative clip structure two opposed hook portions are provided for claw embracement by a thin metal U-shaped member that is interposed between the clip body and the backing member.

18 Claims, 9 Drawing Figures

RETAINER CLIP AND RETAINER CLIP BACKING MEMBER COMBINATION FOR WINDSHIELD WIPER BLADE ASSEMBLIES

FIELD OF THE INVENTION

The present invention is concerned with improvements in or relating to retainer clips that are used with windshield wipers to retain the blade assembly thereof, consisting of a flexible squeegee and a supporting backing member, in the associated pressure-applying superstructure, and is concerned especially with the combination of such a retainer clip with a cooperating backing member.

REVIEW OF THE PRIOR ART

The basic design of automobile windshield wipers has now become relatively standard and they almost universally consist of a blade assembly mounted on a pressure-applying superstructure that is in turn attached to the arm by which the wiper blade assembly is moved. The blade assembly usually consists of an elongated flexible squeegee mounted in a longer correspondingly-elongated, more rigid backing member, the latter being embraced by mounting claws on the superstructure into which and out of which the assembly is slid respectively for mounting and dismounting. The blade assembly of squeegee and backing member commonly is sold as an integral, easily-replacable unit and some simply-operated but secure means must therefore be provided for retaining it in the superstructure claws while permitting its ready release for replacement when required. Such means may consist of a clip which is releasbly attachable both to the blade assembly and to the superstructure.

There has been disclosed and claimed in U.S. Pat. Ser. No. 3,958,295, issued May 25, 1976 to Tridon Limited, a wiper blade assembly that is readily adaptable to wipers of different lengths, the squeegee being cut down, if necessary, from the maximum length unit that is provided and then mounted in the backing member, which is shortened as and when required by breaking it at predetermined transverse lines of weakness corresponding to the different sizes of blade assemblies to be provided. Such a structure presents a particular difficulty in the design of a suitable retainer clip because the claw configuration for a wiper blade of one length may not necessarily correspond to that for any other length. Again it is preferred that the assembly be capable of use with wipers of different manufacturers, and it is unusual for the claw configurations of even the same length blades to be the same.

DEFINITION OF THE INVENTION

It is therefore an object of the present invention to provide a new retainer clip for retaining a windshield wiper blade assembly in the embracing mounting claws of an associated superstructure.

It is a more specific object to provide such a retainer clip that is particularly suited for use in combination with a cooperating backing member with wipers of different mounting claw configurations and/or wiper blade assemblies of different lengths.

In accordance with the present invention there is provided a retainer clip for use in association with a windshield wiper of the type comprising:

a pressure-applying superstructure having along its length a plurality of pairs of opposed mounting claws,
an elongated squeegee, and
a backing member in which the squeegee is mounted and which is in turn mounted on the superstructure by engagement of the mounting claws therewith, the backing member having an upper surface thereof and having on opposite sides thereof respective opposed parallel longitudinally-extending edges which are embraced by the claws;
the clip comprising:
a claw-pair-like clip body constituted by a top wall, two spaced parallel side walls at each side of the top wall, and two inwardly-protruding portions one at each side of each respective side wall, the clip body being adapted to embrace the backing member upper surface and side edges and being capable of sliding movement along the backing member,
the top wall having a flexible member movable towards and away from the backing member, one of the flexible member and the upper surface of the backing member having a projection for engagement in a cooperating recess in the other to retain the clip against longitudinal movement on the backing member,
the clip body having extending longitudinally therefrom a transversely-movable hook member providing between itself and the clip body a space in which a mounting claw can be positioned to retain the clip member against longitudinal movement relative to the superstructure and thereby also retain the backing member against longitudinal movement relative to the superstructure.

Such a clip is used in combination with a backing member having therein a plurality of longitudinally-spaced apertures or having thereon a plurality of longitudinally-spaced projections for cooperation respectively with the said flexible member projection or aperture, so as to permit use of the same backing member alternatively with superstructures of different claw configurations.

Also in accordance with the invention there is provided a retainer clip for use in association with a windshield wiper of the type comprising:

a pressure-applying superstructure having along its length a plurality of pairs of opposed mounting claws,
an elongated squeegee, and
a backing member in which the squeegee is mounted and which is in turn mounted on the superstructure by engagement of the mounting claws therewith, the backing member having an upper surface thereof and on opposite sides thereof respective opposed parallel longitudinally-extending edges which are embraced by the claws;
the clip comprising:
a claw-pair-like clip body constituted by a top wall, two spaced parallel side walls at each side of the top wall, and two inwardly-protruding portions one at each side of each respective side wall, the clip body being adapted to embrace the backing member upper surface and side edges and being capable of sliding movement along the backing member,
the top wall having a flexible member movable towards and away from the backing member, one of the flexible member and the upper surface of the backing member having a projection for engagement in a cooperating recess in the other to retain the clip against longitudinal movement on the backing member, and a thin metal U-shaped member mounted in the clip body with its arms extending in the respective spaces between the said top wall, the parallel side walls and the inwardly protruding portions, the member having at each of its arm ends a transversely-movable hook member providing between itself and the clip body a space in which a respective opposed mounting claw can be positioned to retain the clip member against longitudinal movement relative to the superstructure and thereby also retain the backing member against longitudinal movement relative to the superstructure.

DESCRIPTION OF THE DRAWINGS

Retainer clips and a combination of retainer clip and wiper backing member that are particular preferred embodiments of the invention will now be described, by way of example, with reference to the accompanying diagrammatic drawings wherein.

DESCRIPTION OF THE PREFERRED EMBODIMENTS

Figure 1:
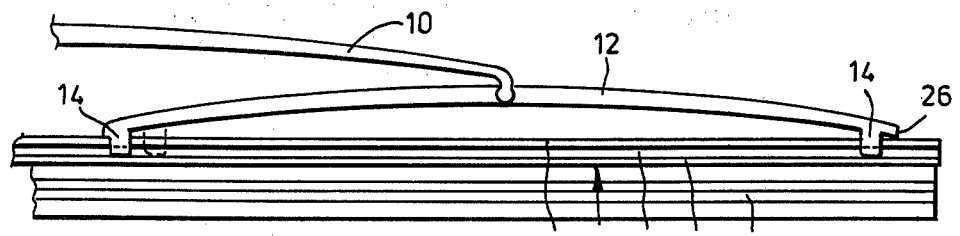
FIG. 1 is a side elevation of an end portion of one form of windshield wiper currently in use.

FIG. 1 shows a first form of well-known windshield wiper superstructure consisting of a primary yoke 10 to the centre of which the wiper arm (not shown) is connected, and two secondary yokes 12 (only one shown) each connected at its centre to a respective end of the primary yoke. Each secondary yoke has at each of its extreme ends a pair of opposed mounting claws 14 that embrace the respective parallel longitudinal edge portions 16 of a backing member 18 with their tips protruding into a pair of opposite longitudinal slots 19. The backing member is of extruded plastic material and has an elongated flexible squeegee 22 engaged in a narrow-necked longitudinal slot 24 therein. It will be noted that the claws are quite deep, so that there is formed therein between the respective edge portions 16 and parallel spaced additional projecting portion 20 substantial space between the top side of the backing member 18 and the underside of the secondary yokes 12.

Figure 2:
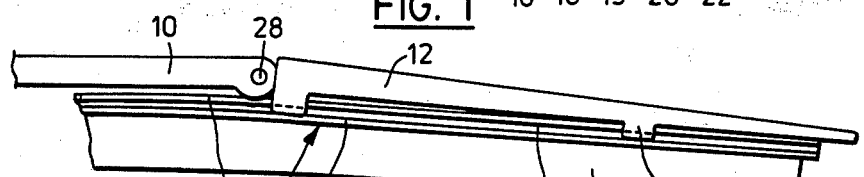
FIG. 2 is a similar side elevation of an end portion of another form of windshield wiper currently in use.
Figure 4:
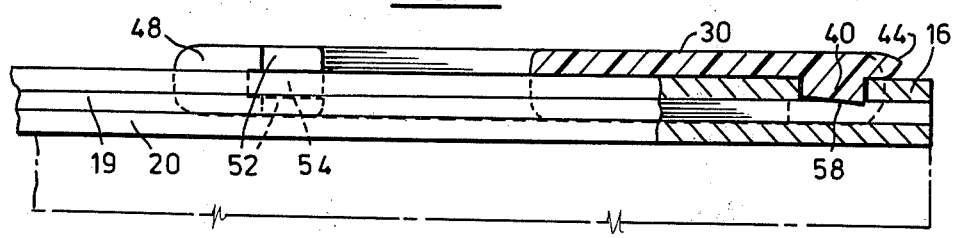
FIG. 4 is a section of the clip of FIG. 3, taken on the line 4—4 thereof, and showing the clip mounted on a backing member of the invention.
Figure 3:
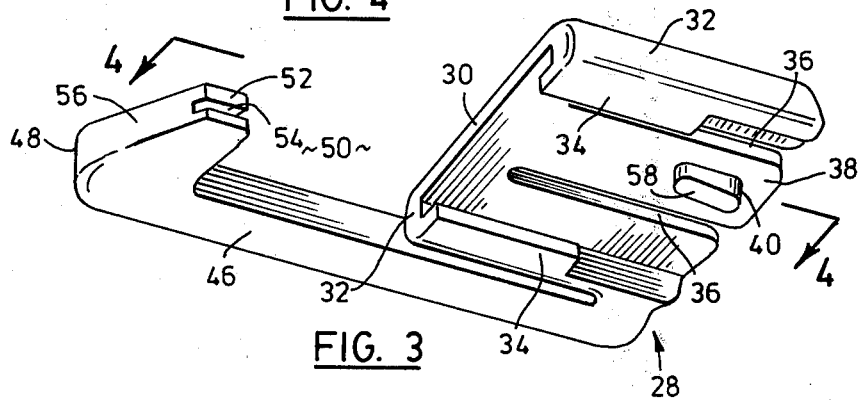
FIG. 3 is a perspective view of the underside of a retainer clip of the invention.
Figure 6:
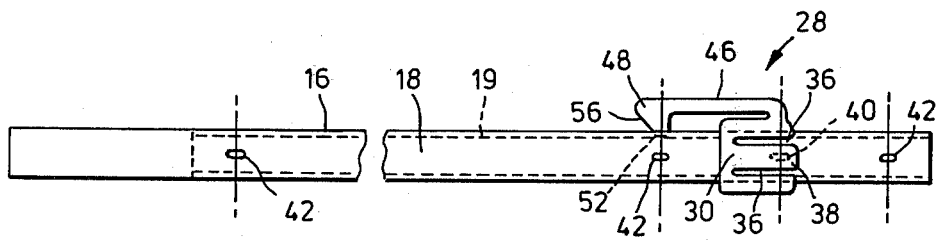
FIG. 6 is a plan view from above of a backing member of the invention and showing the clip of the invention mounted thereon.
Figure 5:
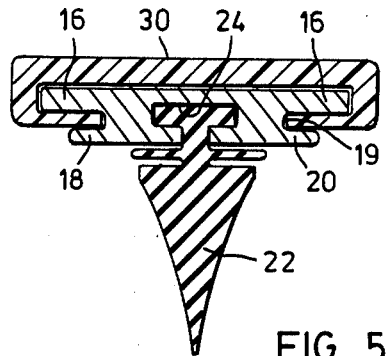
FIG. 5 is a cross-section taken on the line 5—5 of FIG. 4.

In the known structure of FIG. 2 the secondary yokes 12 are pivoted at their ends to the adjacent ends of the primary yokes about pivots 28, and a spring (not shown) is provided to urge the secondary yokes toward the windshield but the structure of the backing member 18, the squeegee 22 and the mounting claws 14 is essentially the same, with the exception that the claws 14 are much shallower.

Referring now to FIGS. 3 through 6, a preferred retainer clip 28 of the invention consists of an integral moulded plastic body having the general configuration of a pair of connected claws, the clip having a top wall 30 that when the clip is in embracing position on the backing member 18 lies closely against the upper surface thereof. The body also has spaced opposed parallel downwardly-extending side walls 32 which terminate in respective returned inwardly-protruding portions 34 that embrace the respective edges 16 of the backing member with the returned portions extending into the slots 20 in the manner of an opposed pair of the mounting claws 14. The top wall has moulded therein two spaced parallel longitudinally-extending slots 36 that form between themselves a longitudinally-extending flexible tongue 38. This tongue has on its underside a slightly longitudinally-elongated, downwardly-extending retaining projection 40 which will fit into any selected one of a number of longitudinally-spaced recesses 42 of corresponding shape provided in the top surface of the backing member. The projection is retained in the selected recess 42 into which it has been placed by the resilience of the material from which the clip is moulded, but can be removed therefrom by flexing the tongue.

The free end 44 of the flexible tongue is rounded to permit the ready insertion underneath of a fingernail, or a simple flat tool, to lift the tongue and disengage the projection 40 from the respective recess 42. A flexible side arm 46, lying in the same general plane as the clip top and side walls, projects from the body longitudinally thereof and terminates in a returned hook-shaped portion 48 to form a transversely-movable hook member, the space 50 between the facing surfaces of the clip body and the hook portion being just sufficient to accommodate any of the mounting claws 14 with which the clip is to be employed. The nose 52 of the hook portion is notched at 54 so as to embrace the edge portion 16, so that the engaged claw is fully embraced without the possibility of accidental disengagement, this engagement also holding the hook end against upward and downward movement.

In the application of the invention the squeegee 22 is cut, if necessary, to the required length and the backing member is broken, if necessary, to the corresponding required length and the resultant blade assembly is mounted in the superstructure claws. A clip is now mounted on the end of the backing member with the protruding portions 36 engaged in the slots 19 and slid along the backing member. The leading face 56 of the hook portion 48 is an outwardly-facing cam which when the hook portion engages a claw 14 will force the flexible arm 46 transversely outwards until the hook portion passes over the claw and snaps back to embrace it as described above. At about the same position the projection 40 enters the selected recess 42 for the particular type and length of wiper, so that the clip is held against longitudinal movement, and in turn holds the wiper assembly against any such movement relative to the engaged superstructure claw in either direction. The lower face 58 of the projection 40 is sloped to form a cam face that will permit the clip to be moved more easily inwards along the backing member than outwards. The space between the superstructure and the backing member need only be sufficient to pass the top wall 30, since the flexible tongue will be further back; the clip can therefore be operative with claws 14 of relatively shallow depth, the front edge of the body being inserted between the yoke and the backing member in the neighbourhood of the claw with the flexible tongue 38 located in some other part having the necessary extra depth. The combination is readily adapted to another make and length of wiper for which it has not previously been designated by providing the appropriate additional aperture 42 and the additional designed line of weakness for breaking the backing member.

Figure 7:
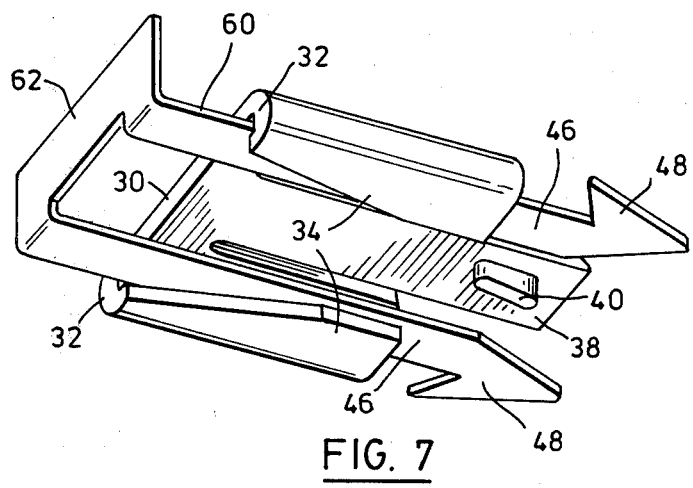
FIG. 7 is a perspective view of a retainer clip that is another embodiment of the invention.

FIG. 7 shows an alternative embodiment, the same reference numbers being used for similar parts. In this embodiment two opposed hook portions 48 are provided for simultaneous embracing engagement with two opposed claws. The hook portions and their associated respective transversely-flexible arms 46 constitute two parallel arms of a thin metal member 60 that is U-shaped as seen in plan; these arms pass through the respective spaces provided between top wall 30, side walls 32 and protruding portions 34, so that these spaces must be sufficiently deep to accommodate both the member 60 and the embraced edges 16 of the backing member. The end portion 62 of the U-shaped member is turned out of the plane of the remainder of the member to provide a stop member that when it engages the adjacent end of the clip body spaces the hook portions 48 the required distance from the clip body for close embracement of the mounting claws.

Although in the embodiments so far described the retainer clip is provided with a projection 40 that cooperates with backing member recess 42, in other embodiments a single aperture may be provided on the flexible tongue 38 for cooperation with a selected one of a plurality of longitudinally-spaced projections on the upper face of the backing member. It is preferred to provide the apertures in the backing member, which is usually extruded, and the projection on the backing member, which is usually moulded.

Figure 8:
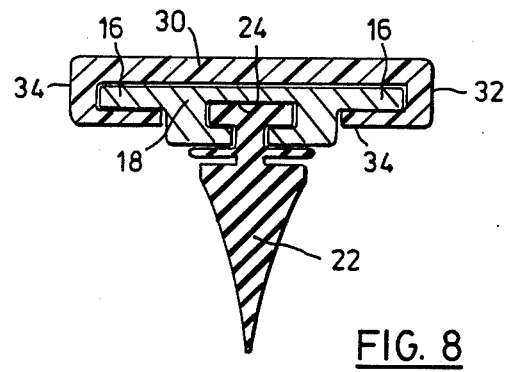
FIGS. 8 and 9 are cross-sections corresponding to FIG. 5 and showing possible cross-sections of other backing members with which the invention can be employed.
Figure 9:
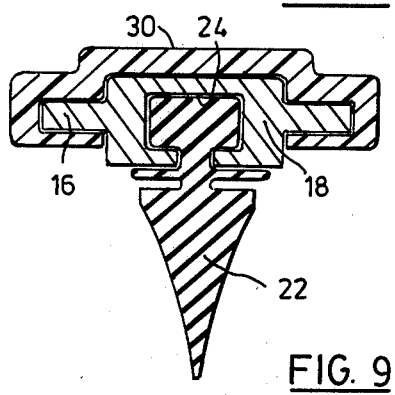

FIGS. 8 and 9 show two alternative cross-sections for the backing member 18 with which the additional projecting portions 20 of the first-described embodiment have been omitted. Such cross-sections are employed for example when the portions 20 are not required either to add to the rigidity of the backing member or to prevent excessive up and down movement between the claws and the backing member.

We claim:

1. A retainer clip for use in association with a windshield wiper of the type comprising:
   a pressure-applying superstructure having along its length a plurality of pairs of opposed mounting claws,
   an elongated squeegee, and
   a backing member in which the squeegee is mounted and which is in turn mounted on the superstructure by engagement of the mounting claws therewith, the backing member having an upper surface thereof and having on opposite sides thereof respective opposed parallel longitudinally-extending edges which are embraced by the claws;
   the clip comprising:
   a claw-pair-like clip body constituted by a top wall, two spaced parallel side walls at each side of the top wall, and two inwardly-protruding portions one at each side of each respective side wall, the clip body being adapted to embrace the backing member upper surface and side edges and being capable of sliding movement along the backing member,
   the top wall having a flexible member movable towards and away from the backing member, one of the flexible member and the upper surface of the backing member having a projection for engagement in a cooperating recess in the other to retain the clip against longitudinal movement on the backing member,
   the clip body having extending longitudinally therefrom a transversely movable hook member providing between itself and the clip body a space in which a mounting claw can be positioned to retain the clip member against longitudinal movement relative to the superstructure and thereby also retain the backing member against longitudinal movement relative to the superstructure.

2. A retainer clip as claimed in claim 1, wherein the projection is provided on the clip body flexible member and the cooperating aperture is provided in the backing member.

3. A retainer clip as claimed in claim 2, in combination with a backing member having therein a plurality of longitudinally-spaced apertures for cooperating with the said flexible member projection, so as to permit use of the same backing member alternatively with superstructures of different claw configurations.

4. A retainer clip as claimed in claim 1, wherein the said hook member is notched at its nose end and embraces the respective edge of the backing member.

5. A retainer clip as claimed in claim 1, wherein the said hook member is provided at an end of a resilient arm extending from the clip body so as to be movable against the resilience of the material away from the backing member to permit passage of a superstructure claw past the hook member and into the said space.

6. A retainer clip as claimed in claim 5, wherein a leading edge of the hook member that engages a superstructure claw as the clip is moved along the backing member is a cam face operative to move the resilient arm away from the backing member against the resilience of the material of the clip body.

7. A retainer clip as claimed in claim 2, wherein the said projection is provided on the underside of a resilient tongue integral with the remainder of the clip body.

8. A retainer clip as claimed in claim 7, wherein the said resilient tongue is formed between two parallel slots in the clip body top wall.

9. A retainer clip as claimed in claim 7, wherein the face of the projection toward the backing member top face is a cam face operative to permit movement of the clip along the backing member more readily in the mounting direction than in the dismounting direction.

10. A retainer clip for use in association with a windshield wiper of the type comprising:
   a pressure-applying superstructure having along its length a plurality of pairs of opposed mounting claws,
   an elongated squeegee, and
   a backing member in which the squeegee is mounted and which is in turn mounted on the superstructure by engagement of the mounting claws therewith, the backing member having an upper surface thereof and having on opposite sides thereof respective opposed parallel longitudinally-extending edges and adjacent parallel slots, each claw embracing a respective edge and protruding into the respective adjacent slots;
   the clip comprising:

a claw-pair-like clip body constituted by a top wall, two spaced parallel side walls at each side of the top wall, and two inwardly-protruding portions one at each side of each respective side wall, the clip body being adapted to embrace the backing member upper surface and side edges and being capable of sliding movement along the backing member, the top wall having a flexible member movable towards and away from the backing member, one of the flexible member and the upper surface of the backing member having a projection for engagement in a cooperating recess in the other to retain the clip against longitudinal movement on the backing member, and a thin metal U-shaped member mounted in the clip body with its arms extending in the respective spaces between the said top wall, the parallel side walls and the inwardly protruding portions, the member having at each of its arm ends a transversely-movable hook member providing between itself and the clip body a space in which a respective opposed mounting claw can be positioned to retain the clip member against longitudinal movement relative to the superstructure and thereby also retain the backing member against longitudinal movement relative to the superstructure.

11. A retainer clip as claimed in claim 10, wherein the projection is provided on the clip body flexible member and the cooperating aperture is provided in the backing member.

12. A retainer clip as claimed in claim 10, in combination with a backing member having therein a plurality of longitudinally-spaced apertures for cooperation with the said flexible member projection, so as to permit use of the same backing member alternatively with superstructures of different claw configurations.

13. A retainer clip as claimed in claim 10, wherein the said hook member is notched at its nose end and embraces the respective edge of the backing member.

14. A retainer clip as claimed in claim 10, wherein each hook member is movable against the resilience of the material of the respective arm to permit passage of the respective superstructure claw end into the said space.

15. A retainer clip as claimed in claim 14, wherein a leading edge of the hook member that engages a superstructure claw as the clip is moved along the backing member is a cam face operative to move the resilient arm away from the backing member.

16. A retainer clip as claimed in claim 10, wherein the said projection is provided on the underside of a resilient tongue integral with the remainder of the clip body.

17. A retainer clip as claimed in claim 16, wherein the said resilient tongue is formed between two parallel slots in the clip body top wall.

18. A retainer clip as claimed in claim 16, wherein the face of the projection toward the backing member top face is a cam face operative to permit movement of the clip along the backing member more readily in the mounting direction than in the dismounting direction.

* * * * *